United States Patent
Luttinen et al.

(10) Patent No.: US 7,370,886 B2
(45) Date of Patent: May 13, 2008

(54) VEHICLE LOWER FRAME STRUCTURE

(75) Inventors: James L. Luttinen, Brighton, MI (US); Alfred L. Kresse, Jr., Romeo, MI (US); John C. Johnson, Macomb Township, MI (US); Soo Tan, Shelby Township, MI (US); Raymond L. Wojdacki, Jr., Rochester, MI (US); Edward L. Pauly, Imlay City, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 11/223,814

(22) Filed: Sep. 9, 2005

(65) Prior Publication Data

US 2006/0061080 A1 Mar. 23, 2006

Related U.S. Application Data

(63) Continuation-in-part of application No. 10/202,396, filed on Jul. 24, 2002, now Pat. No. 7,292,992.

(60) Provisional application No. 60/314,501, filed on Aug. 23, 2001, provisional application No. 60/337,994, filed on Dec. 7, 2001, provisional application No. 60/609,030, filed on Sep. 10, 2004.

(51) Int. Cl.
*B62D 7/22* (2006.01)

(52) U.S. Cl. .................. 280/781; 280/788; 280/784; 296/187.03; 296/205

(58) Field of Classification Search ........... 280/784, 280/783, 781, 793, 163, 166, 797, 798, 788; 296/187.09, 146.6, 205, 187.1, 187.03, 203.02
See application file for complete search history.

(56) References Cited

U.S. PATENT DOCUMENTS

| | | | | |
|---|---|---|---|---|
| 1,290,939 A * | 1/1919 | Dyke | .......................... | 280/783 |
| 3,171,669 A * | 3/1965 | Barenyi | ...................... | 280/784 |
| 3,520,550 A * | 7/1970 | Dysarz et al. | ............. | 280/784 |
| 3,718,364 A * | 2/1973 | Fischer et al. | ............. | 280/784 |
| 3,860,258 A * | 1/1975 | Feustel et al. | ............. | 280/784 |
| 3,869,017 A * | 3/1975 | Feustel et al. | ............. | 280/784 |
| 3,896,896 A * | 7/1975 | Saitoh | ........................ | 280/784 |
| 3,912,295 A * | 10/1975 | Eggert, Jr. | .................. | 280/784 |
| 3,971,588 A * | 7/1976 | Bauer | .......................... | 280/784 |
| 4,355,844 A * | 10/1982 | Fantini Muzzarelli | ...... | 280/784 |
| 5,048,888 A * | 9/1991 | Willy et al. | ............ | 296/187.03 |
| 5,429,388 A * | 7/1995 | Wheatley et al. | ........... | 280/784 |
| 5,431,445 A * | 7/1995 | Wheatley | ..................... | 280/784 |
| 5,555,950 A * | 9/1996 | Harada et al. | ............. | 280/784 |
| 5,611,568 A * | 3/1997 | Masuda | ...................... | 280/784 |
| 5,685,599 A * | 11/1997 | Kitagawa | .................... | 280/784 |
| 6,068,330 A * | 5/2000 | Kasuga et al. | ............. | 280/784 |
| 6,109,654 A * | 8/2000 | Yamamoto et al. | ......... | 280/784 |
| 6,131,685 A * | 10/2000 | Sakamoto et al. | .......... | 180/232 |
| 6,203,098 B1 * | 3/2001 | Motozawa et al. | .... | 296/187.09 |
| 6,367,869 B1 * | 4/2002 | Baccouche et al. | ......... | 280/784 |
| 6,511,119 B2 * | 1/2003 | Takase et al. | ............... | 280/784 |
| 6,601,873 B1 * | 8/2003 | Bartesch et al. | ............ | 280/784 |

(Continued)

*Primary Examiner*—Hau Phan

(57) ABSTRACT

A vehicle frame structure provides a large protected cavity. Lateral energy management zones absorb impact energy on the sides of the protected cavity, and forward and rearward energy management zones absorb impact energy forward and rearward of the protected cavity. In an exemplary embodiment, the frame is characterized by dual load paths along the protected cavity and by graduated front and rear energy management zones.

8 Claims, 2 Drawing Sheets

U.S. PATENT DOCUMENTS 6,631,942 B1 * 10/2003 Kitagawa ................. 296/187.1
6,866,115 B2 * 3/2005 Miyasaka .................. 180/311
6,957,846 B2 * 10/2005 Saeki ...................... 296/187.1

* cited by examiner

VEHICLE LOWER FRAME STRUCTURE

CROSS REFERENCE TO RELATED APPLICATIONS

This application is a continuation in part of U.S. patent application Ser. No. 10/202,396, filed Jul. 24, 2002 now U.S. Pat. No. 7,292,992, which claims the benefit of U.S. Provisional Application 60/314,501, filed Aug. 23, 2001, and U.S. Provisional Application 60/337,994, filed Dec. 7, 2001; this application also claims the benefit of U.S. provisional patent application No. 60/609,030, filed Sep. 10, 2004; each of the aforementioned applications is hereby incorporated by reference in its entirety.

TECHNICAL FIELD

This invention relates to vehicular frames that include members defining a protected cavity, and members creating energy management zones surrounding the protected cavity.

BACKGROUND OF THE INVENTION

Alternative vehicle fuels, such as compressed hydrogen and natural gas, have lower specific thermal energy per unit mass than more conventional fuels like gasoline and diesel fuel. Accordingly, an alternative fuel vehicle may have a significantly reduced driving range before refueling than a conventional fuel vehicle with identical fuel storage capacity. It is therefore desirable for alternative fuel vehicles to accommodate larger fuel storage tanks than those found in conventional fuel vehicles.

It is also desirable to place alternative fuel storage tanks in a protected location within the vehicle chassis. Accordingly, alternative fuel storage tanks are typically placed between the rear wheels of the vehicle. However, packaging space between the rear wheels is limited, which, in turn, limits the size of the tanks and, therefore, the vehicle travel range between refuelings.

SUMMARY OF THE INVENTION

A vehicle chassis frame is provided that includes a large, protected cavity for stowage of fuel tanks or other vehicle components. The frame of the invention thus enables increased travel range between refuelings compared to the prior art. The frame includes four central rails. A first and second rail are spaced apart to at least partially define the protected cavity. A third rail is outboard of the first rail and cooperates with the first rail to at least partially define a first lateral cavity therebetween. A fourth rail is outboard of the second rail and cooperates with the second rail to at least partially define a second lateral cavity therebetween.

The third and fourth rails are preferably sufficiently positioned to receive a load resulting from a side impact to the vehicle of which the frame is a part. The first and second lateral cavities function as energy management zones to allow the third and fourth rails to deform and thereby absorb impact energy on the sides of the protected cavity formed by the first and second rails.

The frame further includes two front members that extend longitudinally forward of the protective cavity to receive a load resulting from a frontal vehicle impact. A first front member is connected to both the first rail and the third rail so that the first and third rails form dual load paths along the protective cavity. That is, a load received by the first front member in a frontal impact is distributed between the first and third rails to reduce the load borne by the first rail at the protected cavity. Similarly, a second front member is connected to both the second rail and the fourth rail to distribute frontal impact loads therebetween.

In an exemplary embodiment, the front members each include a first crush initiator configured to cause or initiate deformation of the front members when the front members are subjected to a frontal impact load of a first predetermined magnitude, thereby to absorb energy forward of the protective cavity. The front members also each include a second crush initiator located rearward of the first crush initiators. The second crush initiators are configured to cause or initiate deformation of the front members when the front members are subjected to a frontal impact load of a second predetermined magnitude greater than the first predetermined magnitude. The first and second crush initiators thus create two energy management zones forward of the protected cavity to react or absorb impacts.

Rear members having crush initiators are likewise connected to the rails to provide two energy management zones rearward of the protected cavity.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
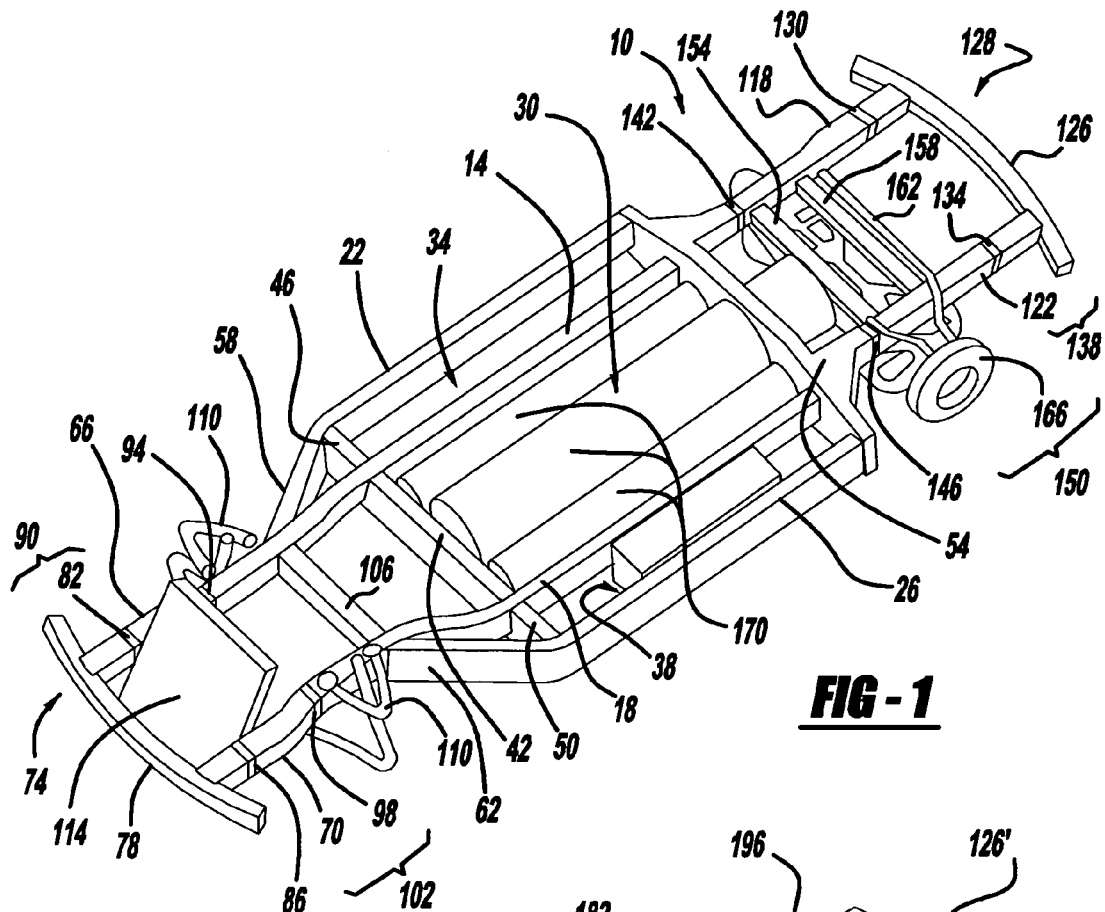
FIG. 1 is a schematic perspective view of a vehicle frame in accordance with the present invention.

Referring to FIG. 1, a vehicle lower structural frame 10, on which an upper body (not shown) is mountable, is schematically depicted. The frame 10 includes a first rail 14, a second rail 18, a third rail 22, and a fourth rail 26. The first rail 14 and the second rail 18 cooperate to at least partially define a protected cavity 30 therebetween. The third rail 22 is outboard of the first rail 14, and cooperates with the first rail 14 to at least partially define a first lateral cavity 34 outboard of the protected cavity 30. The fourth rail 26 is outboard of the second rail 18, and cooperates with the second rail 18 to at least partially define a second lateral cavity 38 outboard of the protected cavity 30.

Cross member 42 rigidly interconnects the first and second rails 14, 18, and defines the forwardmost extent of the protected cavity 30. Cross member 46 rigidly interconnects the first and third rails 14, 22, and forms the forwardmost extent of the first lateral cavity 34. Similarly, cross member 50 rigidly interconnects the second and fourth rails 18, 26, and forms the forwardmost extent of the second lateral cavity 38. Cross member 54 rigidly interconnects the first, second, third and fourth rails, and forms the rearwardmost extent of the protected cavity 30, the first lateral cavity 34, and the second lateral cavity 38. The third and fourth rails 22, 26, and the first and second lateral cavities 34, 38 form first and second lateral energy management zones on the sides of the protected cavity 30.

The third rail 22 includes a portion 58 that extends laterally inboard forward of cross member 46. Portion 58 is rigidly connected to the first rail 14 such as by welding. Similarly, the fourth rail 26 includes a portion 62 that extends laterally inboard forward of cross member 50. Portion 62 is rigidly connected to the second rail 18 such as by welding. The frame 10 includes two front members that extend longitudinally forward of the third and fourth rails 22, 26, and the protected cavity 30, to receive a load resulting from a frontal vehicle impact. In the embodiment depicted, the two front members are segments 66, 70 of the first and second rails 14, 18, respectively, that extend substantially to the forward edge 74 of the vehicle frame 10. In a frontal vehicle impact, segments 66, 70 are configured to receive a load from the front bumper member 78.

Segments 66, 70 each include a respective first crush initiator 82, 86 configured to cause or initiate deformation of the segments 66, 70 in a first front crush region 90 when the segments 66, 70 in the first front crush region 90 are subjected to a load having a first predetermined magnitude. The first crush region 90 extends between the first front crush initiators 82, 86 and the forward edge 74 of the vehicle frame 10. Deformation of segments 66, 70 in the first front crush region 90 absorbs frontal impact energy forward of the protected cavity 30. The first front crush region 90 is thus a first forward energy management zone in the vehicle frame 10. Exemplary crush initiators and energy management zones are described in commonly assigned U.S. Pat. No. 6,584,689, issued Jul. 1, 2003 to Bruggemann et al, which is hereby incorporated by reference in its entirety. Crush initiators include locally weakened areas such as dimples, indentations, locally small cross sectional areas, etc.

Segments 66, 70 each include a respective second crush initiator 94, 98 rearward of the first crush initiators. The second crush initiators 94, 98 are configured to cause deformation of the segments 66, 70 in a second front crush region 102 when the segments 66, 70 in the second front crush region 102 are subjected to a load having a second predetermined magnitude greater than the first predetermined magnitude. The second front crush region 102 is thus a second forward energy management zone in the vehicle frame 10. The second front crush region extends between the first front crush initiators 82, 86 and the second front crush initiators 94, 98.

Cross member 106 rigidly interconnects segments 66, 70 adjacent where portions 58, 62 of rails 22, 26 are connected to rails 14, 18. Front suspension components 110 configured to rotatably support wheels (not shown) are mounted to segments 66, 70, and a heat exchanger 114 is at least partially located within a cavity formed by segments 66, 70, cross member 106, and front bumper member 78.

Segment 66 is part of the first rail. Accordingly, segment 66 is connected to the first rail 14 and the third rail 22 so that the first and third rails form dual load paths along the protective cavity 30. That is, if segment 66 receives a load of magnitude X from bumper member 78 in a frontal impact event, then rail 14 at the protected cavity 30 will bear a load of magnitude X-Y and the third rail 22 will receive a load of magnitude Y. Similarly, segment 70 is part of the second rail 18. Accordingly, the segment 70 is connected to the second rail 18 and the fourth rail 22 so that the second and fourth rails form dual load paths along the protective cavity 30.

The frame 10 includes two rear members that extend longitudinally rearward of the third and fourth rails 22, 26, and the protected cavity 30, to receive a load resulting from a rear vehicle impact. In the embodiment depicted, the two rear members are rear rails 118, 122. Rear rails 118, 122 are connected to the first, second, third and fourth rails 14, 18, 22, 26 via cross member 54. In a rear impact event, rear rails 118, 122 are configured to receive an impact load from rear bumper member 126 at the rearward edge 128 of the frame 10. Loads received by either of the two rear rails 118, 122 are distributed among four rails 14, 18, 22, 26; thus, rails 22, 26 bear a portion of the impact load received by either of the rear rails, thereby lessening the load borne by rails 14, 18 along the protective cavity.

Rear rails 118, 122 each include a respective first crush initiator 130, 134 configured to cause deformation of the rails 118, 122 in a first rear crush region 138 when the rails 118, 122 in the first rear crush region 138 are subjected to a load having a first predetermined magnitude. Deformation of rails 118, 122 in the first rear crush region 138 absorbs rear impact energy rearward of the protected cavity 30. The first rear crush region 138 is thus a first rearward energy management zone in the vehicle frame 10.

Rear rails 118, 122 each include a respective second crush initiator 142, 146 rearward of the first crush initiators 130, 134. The second crush initiators 142, 146 are configured to cause deformation of the rails 118, 122 in a second rear crush region 150 when the rails 118, 122 in the second rear crush region 150 are subjected to a load having a second predetermined magnitude greater than the first predetermined magnitude. The second rear crush region 150 is thus a second rearward energy management zone in the vehicle frame 10.

Cross members 154, 158 rigidly interconnect the rear rails 118, 122. Rear suspension system components 162 are rigidly mounted to the rear rails for rotatably supporting rear wheels 166.

The protected cavity 30 contains three hydrogen storage tanks 170. The tanks 170 store hydrogen for use by a fuel cell stack (not shown) in generating electrical energy to propel the vehicle. Frame members such as rails, cross members, and bumper members may be formed from a variety of manufacturing processes within the scope of the claimed invention. The frame members of FIG. 1 are preferably hydroformed tubes.

Figure 2:
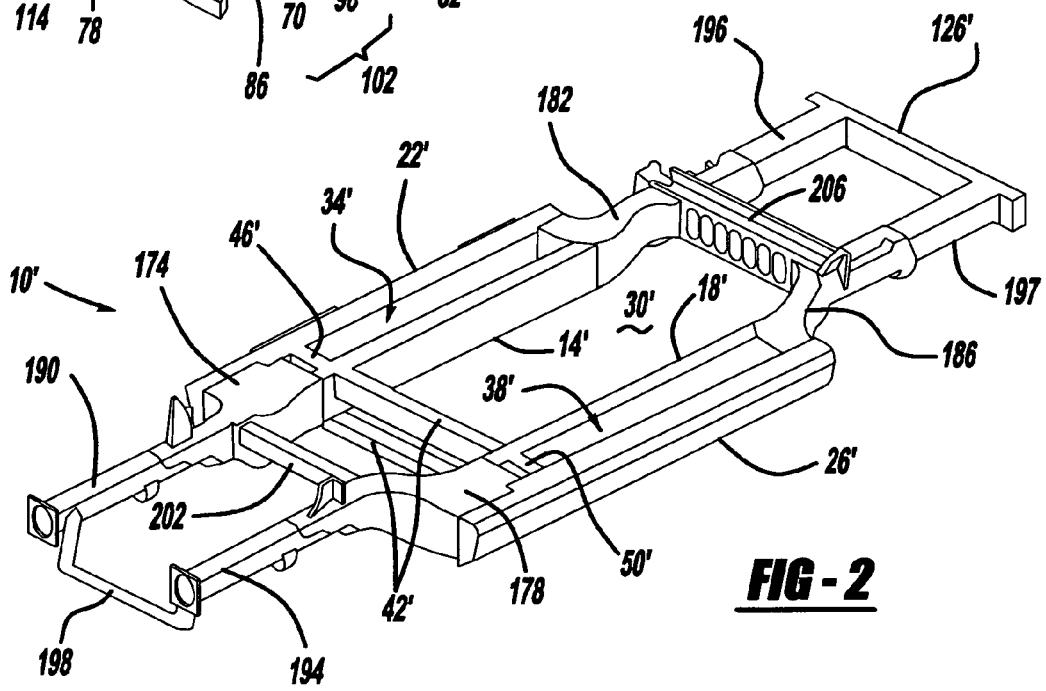
FIG. 2 is a schematic perspective view of an alternative vehicle frame in accordance with the present invention.

Referring to FIG. 2, wherein like reference numbers refer to like components from FIG. 1, an alternative vehicle frame 10' configuration is schematically depicted. Vehicle frame 10' includes a first rail 14' and a second rail 18' cooperating to at least partially define a protected cavity 30' therebetween. A third rail 22' is outboard of the first rail 14' and cooperates with the first rail 14' to at least partially define a first lateral cavity 34' outboard of the protected cavity 30'. A fourth rail 26' is outboard of the second rail 18' and cooperates with the second rail 18' to at least partially define a second lateral cavity 38' outboard of the protected cavity 30'. Cross members 42' rigidly interconnect the first and second rails 14', 18'. Cross member 46' rigidly interconnects the first and third rails 14', 22'. Cross member 50' rigidly interconnects the second and fourth rails 18', 26'.

The frame 10' also includes a first node 174, a second node 178, a third node 182, and a fourth node 186. The nodes, which are preferably cast, substantially rigidly interconnect various members of frame 10'. More specifically, the first node 174 interconnects a first front member 190 with the first rail 14' and the third rail 22' so that the first rail 14' and the third rail 22' form dual load paths along the protected cavity 30'. The second node 178 interconnects a second front member 194 with the second rail 18' and the fourth rail 26' so that the second and fourth rails form dual load paths along the protected cavity 30'. The third node 182 interconnects a first rear frame member 196 to the first and third rails 14' 22' so that the first and third rails form dual load paths along the protected cavity. The fourth node 186 interconnects a second rear frame member 197 to the second and fourth rails 18', 26' so that the second and fourth rails form dual load paths along the protected cavity.

Cross member 198 connects the two front frame members 190, 194. Cross member 202 connects the first and second nodes. Cross member 206 connects the third and fourth nodes. Similar to the frame of FIG. 1, frame 10' includes crush initiators sufficiently positioned to provide first and second front energy management zones and first and second rear energy management zones. It may be desirable for the frame 10' to include two rigid, longitudinally-oriented members interconnecting cross member 206 and one of cross members 42'. It may also be desirable for cross member 202 to extend transversely over nodes 174, 178 to body hinge pillars (not shown). Rear bumper member 126' interconnects rear frame members 196, 197.

Figure 3:
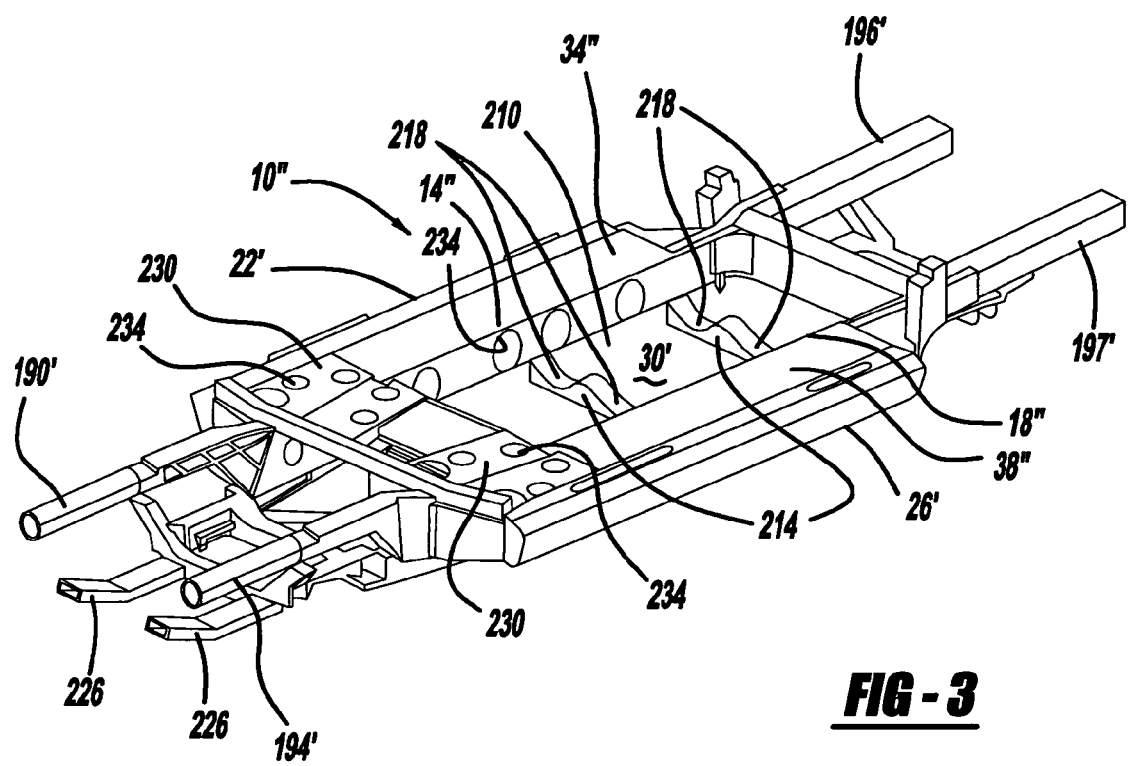
FIG. 3 is a schematic perspective view of another alternative vehicle frame in accordance with the present invention.

Those skilled in the art will recognize a variety of materials and shapes that may be employed to form the frame elements within the scope of the claimed invention. For example, the rails, cross members, front members, rear members, and connecting members such as nodes may, within the scope of the claimed invention, be stamped sheet metal components operatively welded together. Similarly, rails, front members, etc., may have a variety of different cross-sectional shapes within the scope of the claimed invention. Referring to FIG. 3, wherein like reference numbers refer to like components from FIGS. 1 and 2, another alternative frame 10" configuration is schematically depicted. The first and second rails 14", 18" are roll-formed plates having an open cross section. Other frame members are formed with press brake plate and stampings, as well as limited castings. A belly pan 210 forms the lower extent of protected cavity 30". Tank locating members 214 are transversely oriented and define concavities 218 for retaining the tanks. Frame 10" further includes two upper front members 190', 194' and two lower frame members 226. Front members 190', 194' are characterized by the same energy management zones as the front members of FIGS. 1 and 2. Rails 14", 18" and connecting plates 230 include holes 234 formed therein to reduce weight and provide access to the protected cavity 30". Lateral cavities 34', 38' are monocoque boxes formed in part by the rails 14", 18". Plates 230 are replacements for nodes.

A vehicle frame according to several aspects of the invention is disclosed in commonly-assigned U.S. patent application Ser. No. 10/202,396, filed Jul. 24, 2002, and which is hereby incorporated by reference in its entirety.

While the best modes for carrying out the invention have been described in detail, those familiar with the art to which this invention relates will recognize various alternative designs and embodiments for practicing the invention within the scope of the appended claims.

The invention claimed is:

1. A vehicle frame comprising:
   a first rail and a second rail, the first and second rails extending generally longitudinally with respect to the vehicle frame;
   a first member positioned forward or rearward of at least a portion of the first and second rails and operatively connected to the first and second rails such that, if the first member receives a load in a vehicle impact event, at least part of the load is transferred to both the first rail and the second rail to create two load paths;
   a third rail being generally longitudinally oriented, spaced a distance apart from the first rail, and cooperating with the first rail to at least partially form a first cavity;
   a fourth rail being generally longitudinally oriented; and
   a second member being positioned forward or rearward of at least a portion of the third and fourth rails and operatively connected to the third and fourth rails such that, if the second member receives a load in a vehicle impact event, at least part of the load is transferred to both the third rail and the fourth rail to create two load paths;
   wherein the first member includes a first locally weakened crush initiator configured to initiate deformation of the first member when the first member is subjected to a load having a first magnitude; and wherein the first member includes a second locally weakened crush initiator configured to initiate deformation of the first member when the first member is subjected to a load having a second magnitude greater than the first magnitude.

2. The vehicle frame of claim 1, wherein said first member is generally longitudinally oriented.

3. The vehicle frame of claim 1, further comprising at least one compressed gas storage tank being at least partially located within the first cavity.

4. The vehicle frame of claim 1, wherein the second rail is positioned outboard of the first rail, the first and second rails at least partially defining a second cavity therebetween; and wherein the fourth rail is positioned outboard of the third rail, the fourth and third rails at least partially defining a third cavity therebetween.

5. The vehicle frame of claim 1, wherein the first member is a segment of the first rail.

6. A vehicle frame comprising:
   a first rail;
   a second rail spaced a distance apart from the first rail and cooperating with the first rail to at least partially define a protected cavity;
   a third rail outboard of the first rail and cooperating with the first rail to at least partially define a first lateral cavity outboard of the protected cavity;
   a fourth rail outboard of the second rail and cooperating with the second rail to at least partially define a second lateral cavity outboard of the protected cavity;
   a first member extending forward or rearward of the third rail and configured to receive a first load in an impact and transfer portions of the first load to the first and third rails; and a second member extending forward or rearward of the fourth rail and configured to receive a second load in an impact and transfer portions of the second load to the second and fourth rails; and
   a storage tank being at least partially disposed within the protected cavity.

7. The vehicle frame of claim 6, wherein the first and second members include respective first locally weakened crush initiators configured to initiate deformation of the first and second members when the first and second members are subjected to a load having a first magnitude.

8. The vehicle frame of claim 7, wherein the first and second members further include respective second locally weakened crush initiators configured to initiate deformation of the first and second members when the first and second members are subjected to a load having a second magnitude greater than the first magnitude.

* * * * *